3,440,880
TRANSLATING SYSTEM FOR LIQUID
LEVEL MEASUREMENTS
Nils Peter Lilloe Höyer, Baerumsveien 242,
Bekkestua, Oslo, Norway
Filed Aug. 23, 1967, Ser. No. 662,627
Claims priority, application Norway, Aug. 23, 1966,
160,676
Int. Cl. G01f 23/06
U.S. Cl. 73—321                              1 Claim

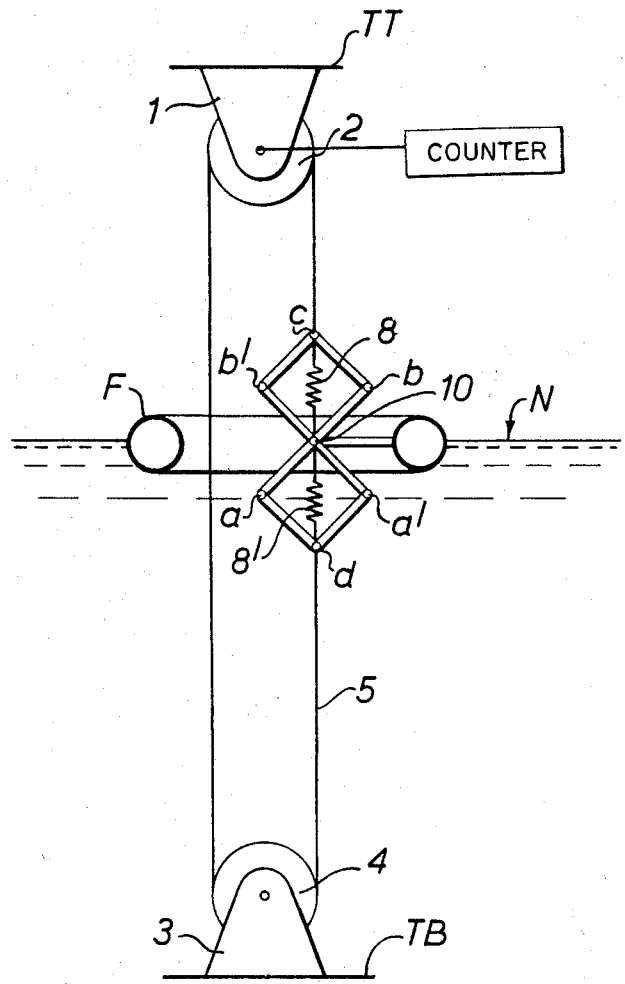

ABSTRACT OF THE DISCLOSURE

Apparatus for the measurement of liquid levels in a tank or reservoir having a float suspended by a tape or wire between an upper wheel and a lower wheel. A spring-loaded structure of rigid members pivotally hinged is provided between the two ends of the tape or wire and the float to compensate for variations in the length of the tape or wire.

---

The present invention relates to a system by which the changes in a liquid level in a storage tank or a reservoir can be measured with great accuracy.

The system comprises a float or a sensing element which by means of a flexible tape or wire translates all vertical float movements into rotary movements of a level indicating instrument in which there is arranged at the top of the tank a wheel over which the tape or wire runs, one end of the tape being yieldingly secured to the upper part of the float, the tape also running under a wheel arranged near the bottom of the tank, the other end of the tape being yieldingly secured to the lower part of the float.

The invention especially provides a translation system which will compensate for all roof or deck deflections and and also compensate for longitudinal variations in the tape or wire above the liquid level due to temperature expansion or contraction which may cause great errors in the level reading.

These purposes are attained by the use of an element which is fixed to the float. The upper and the lower ends of the tape are fixed to this element which may consist of one or more parallelograms or other forms of stiff members hinged together in such a way that any possible movements of the upper and lower ends of the tape are fully controlled. These movements can either be made equal for both ends of the tape or given a certain proportion by altering the length of the stiff members. The element or structure may have the shape of a single or double pantograph or the like.

The upper and lower points of the element to which the tape is connected are pulled together by means of tension springs or torsion springs.

In this way an elastic connection is obtained between the tape ends and the float thus preventing excessive stress or rupture of the tape by variations in the distance between the upper and lower wheels in the tank.

Deflections in the roof will not influence the measured level, as any deflection will be equally divided on both sides of the float, thus causing no movements of the upper wheel.

Further the invention will compensate for all changes in length of the tape above the liquid level, for instance, due to temperature variations which can be significant in a storage tank due to sun radiation. Such expansions and/or contractions of the tape will be of the same magnitude on both sides of the upper wheel. These expansions or contractions will be absorbed by the springs acting on the element at the float and equally divided above and below the point where the element is fixed to the float. Consequently, there will be no rotation or movements of the upper wheel or in the counter.

Previously known systems using a tension spring to absorb any length variation of the tape will cause errors in the level reading in proportion to the length variations of the tape. Certain devices using an endless tape where the upper wheel is yieldingly suspended near the top of the tank may give compensation actions but on the other hand these systems requires complicated transmission systems in order to transfer the float movements through the tank shell or roof.

The sole figure in the accompanying drawing shows by way of example one embodiment of the invention.

The float F, which in this case is shown as an annular float, is suspended by means of the tape or wire 5 between the tank top TT and the tank bottom TB by means of an upper wheel 2 which is secured to the tank by means of a bracket 1 and another wheel 4 secured to the tank bottom by the bracket 3. The upper or lower wheel may be used as driving means in order to transfer all vertical float movements to known indicating or recording devices, such as a counter or a dial box means as the one shown in Patent 1,585,382, outside the tank.

The liquid level in the storage tank is indicated by an N.

The float F is pivotally hinged at 10 to a structure of stiff struts or members with hinged connections. In the illustrated example, the members a–b and a'–b' are stiff and pass through the hinged point 10. The hinge points b, b' and a, a' are further connected by stiff members to point c and d respectively which both are connected to point 10 by means of tension springs 8 and 8'. Points c and d are also respectively connected to the upper and the lower ends of the tape as shown in the drawing.

The tension springs may be replaced by two spiral- or torsion springs arranged on a pivot through points 10. It may be clearly understood that the tape will be kept tight by the action of the two springs, and that the wheel 2 can be raised or lowered with the tank top without causing any rotation of the wheel.

In the same way no rotation of the wheel 2 will occur if the tape 5 is expanded or contracted above the liquid level N.

What I claim is:
1. In a liquid level measuring system for a tank or reservoir in which a flexible member connected at its ends to a float is looped over an upper and lower wheel secured to said tank, a connection arrangement connecting the flexible member to said float, said arrangement comprising two stiff struts of equal length, means pivotably connecting said struts together in intersecting relation and for connecting said struts pivotally to a said float at the intersection thereof, two pairs of further struts of equal length, means to connect the struts of each pair pivotally to each other and to the first said struts to form a scissor-like construction consisting of two adjustable parallelograms, and springs connected across the parallelograms as diagonals thereof and in colinear relationship with each other and with said flexible member, the free diagonal points of said parallelograms being connected to spaced points on said flexible member, said flexible member being adapted to control an indicator.

References Cited

UNITED STATES PATENTS

| | | | |
|---|---|---|---|
| 1,378,327 | 5/1921 | Cox | 73—321 |
| 1,585,382 | 5/1926 | Haigh et al. | 73—321 |
| 1,743,990 | 1/1930 | Weymann | 74—89.22 |
| 1,823,801 | 9/1931 | Hiatt | 73—321 |
| 1,848,789 | 3/1932 | Logan et al. | 73—321 X |
| 2,171,899 | 9/1939 | Scheurich | 73—321 |
| 3,163,055 | 12/1964 | Jeffree | 74—89.2 X |

LOUIS R. PRINCE, *Primary Examiner.*

DANIEL M. YASICH, *Assistant Examiner.*

U.S. Cl. X.R.

74—89.22